Aug. 23, 1955 — D. H. WESTWOOD — 2,716,233
PULSE-ECHO DISTANCE MEASURING SYSTEM
Filed Nov. 25, 1950 — 4 Sheets-Sheet 2
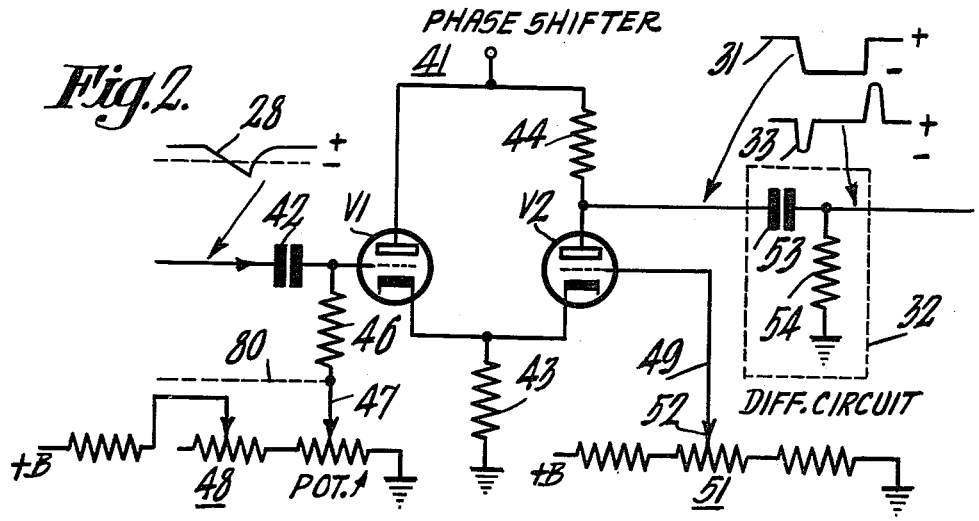
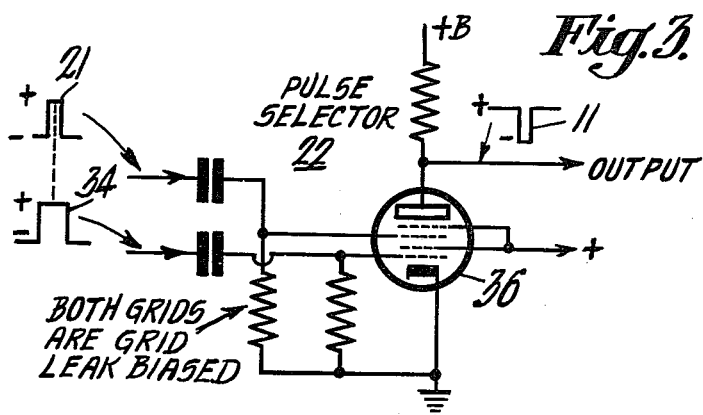
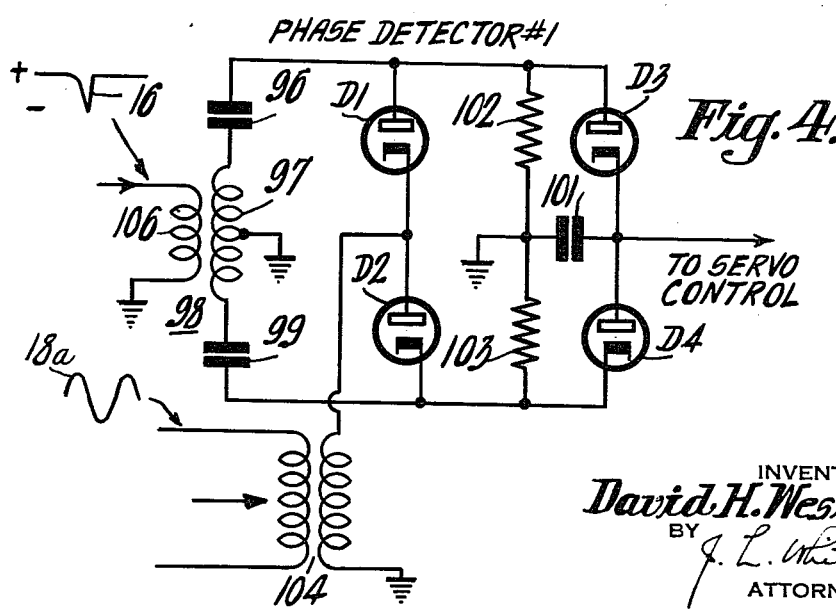
INVENTOR
David H. Westwood
BY
J. L. Whittaker
ATTORNEY Aug. 23, 1955 D. H. WESTWOOD 2,716,233
PULSE-ECHO DISTANCE MEASURING SYSTEM
Filed Nov. 25, 1950 4 Sheets-Sheet 3
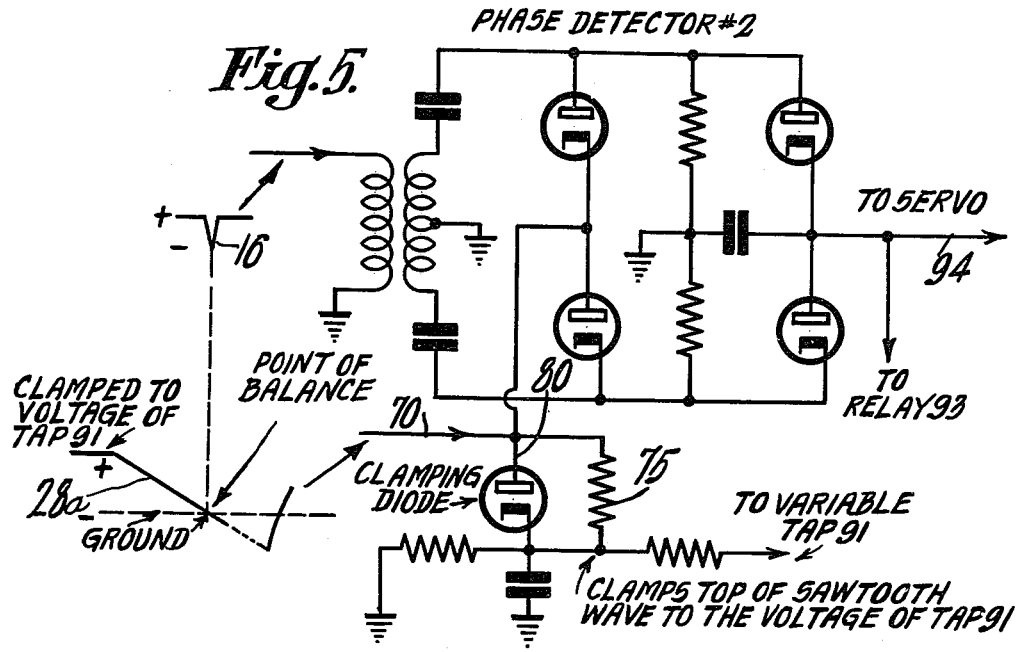
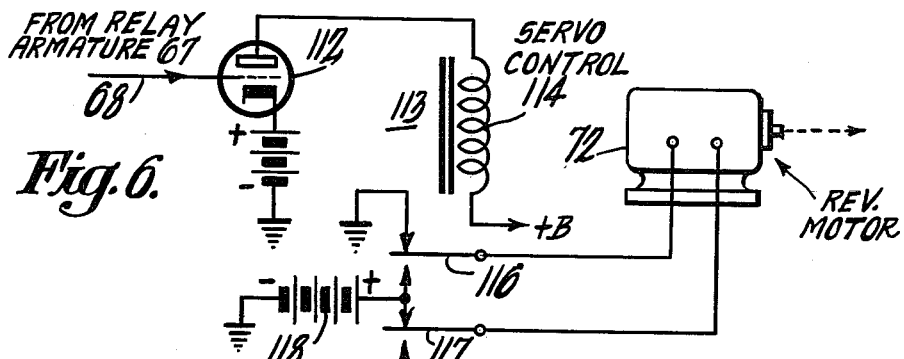
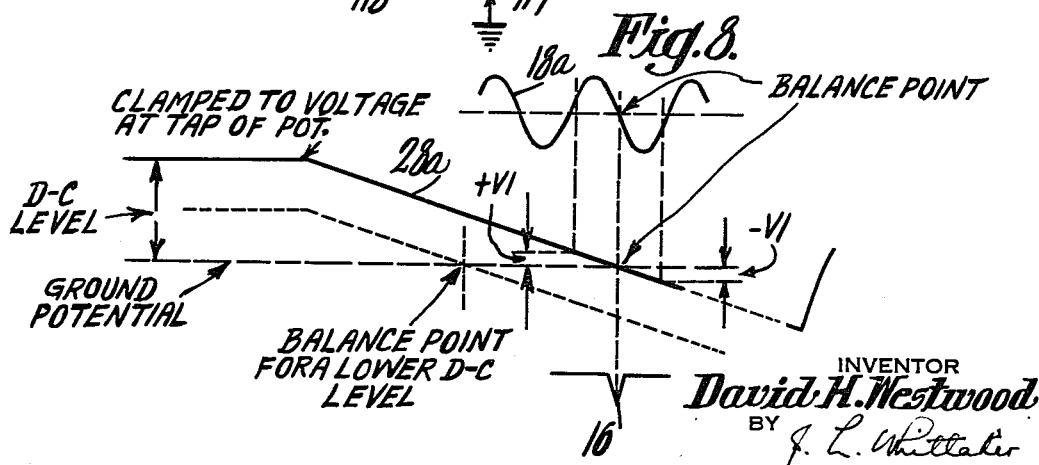
INVENTOR
David H. Westwood
BY
ATTORNEY

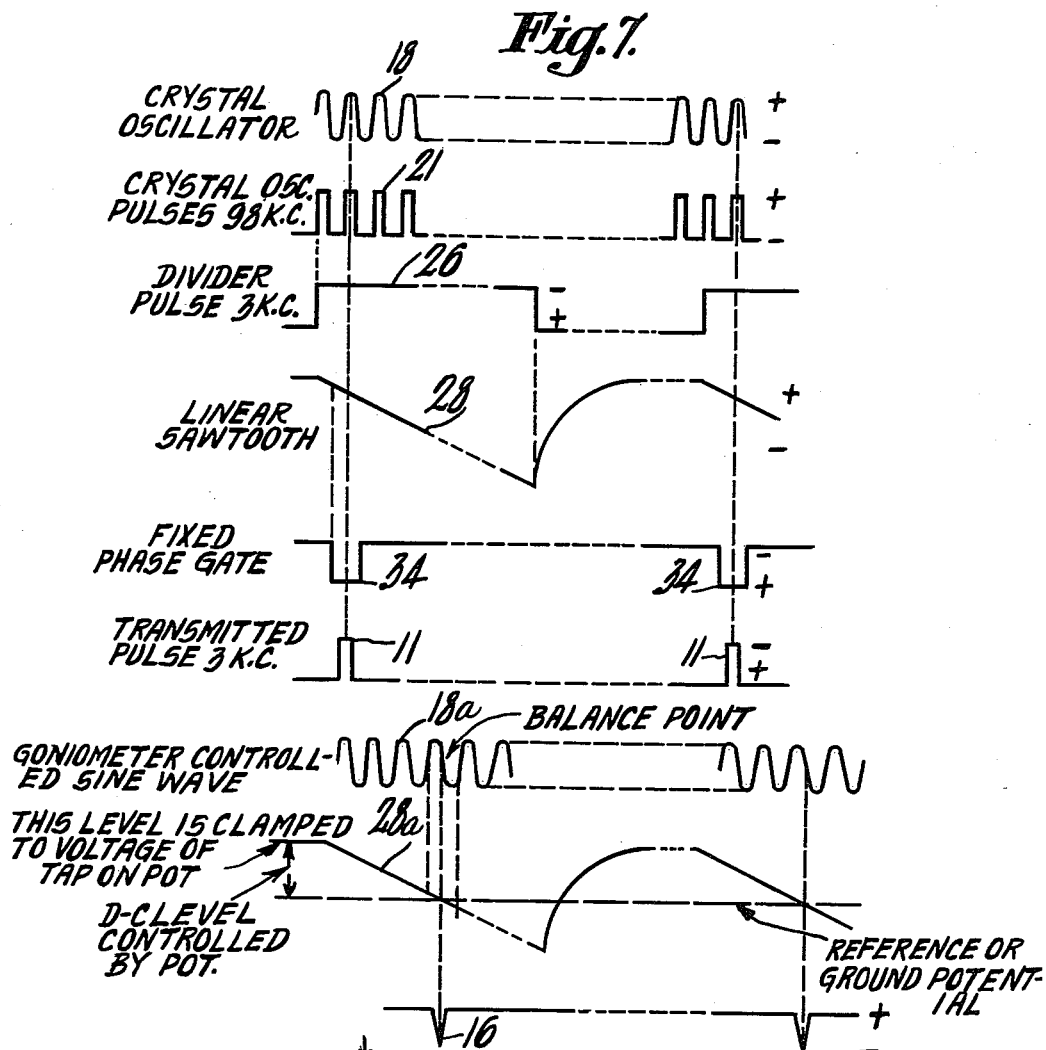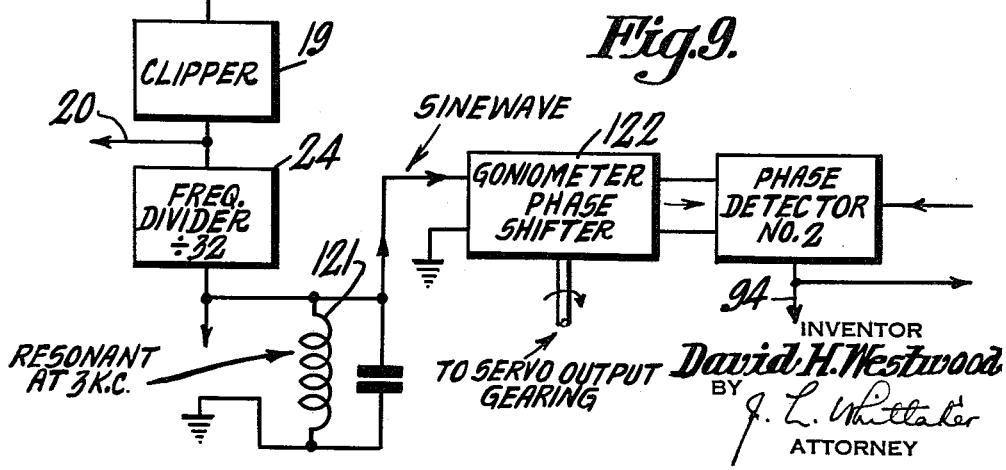

United States Patent Office 2,716,233
Patented Aug. 23, 1955

2,716,233

PULSE-ECHO DISTANCE MEASURING SYSTEM

David H. Westwood, Haddonfield, N. J., assignor to Radio Corporation of America, a corporation of Delaware Application November 25, 1950, Serial No. 197,536

9 Claims. (Cl. 343—7)

My invention relates to radio distance determining systems such as radio altimeters and particularly to systems of the pulse-echo type that provide a direct reading as by means of a pointer and dial.

An object of the invention is to provide an improved pulse-echo distance measuring system.

A further object of the invention is to provide an improved pulse-echo distance measuring system of the type having a servo system wherein a shaft assumes an angular position that is a function of distance.

A still further object of the invention is to provide a simplified pulse-echo distance measuring system that is accurate and reliable in operation.

In practicing the invention there is employed a system of the type wherein the time interval between transmission of a pulse and reception of said pulse after reflection from the target (the earth's surface in the case of an altimeter) is determined by comparing the phase of the reflected pulse with the phase of a comparison wave that has been shifted in phase a known amount with respect to the transmitted pulse, that is, with respect to a reference time. A system of this general type is described, for example, in application Serial No. 77,178 filed February 18, 1949, in the name of Randall C. Ballard and entitled Pulse Echo Distance Measuring Systems, now U. S. Patent 2,638,587 granted May 12, 1953. The reflected pulse and the comparison wave are applied to a phase detector. The output of the phase detector controls a servo or follow-up circuit which drives phase shifters to shift the phase of the comparison wave. This drive continues until a balanced condition is reached. A dial calibrated in distance and a pointer connected to the phase shifters indicate altitude or distance.

The system of the present invention is an improvement over the above-mentioned Ballard system, particularly in that there is less tendency for the servo to overshoot. In this respect the present invention has the same advantage as the system described in Trachtenberg et al. Serial No. 177,486, filed August 3, 1950, and entitled Pulse-Echo Distance Measuring Systems. The system of the present invention, however, is simpler and less expensive than the Trachtenberg et al. system.

In accordance with a preferred embodiment of the present invention a crystal oscillator controls the timing of the transmitted pulses and also supplies a sine wave signal to a goniometer type phase shifter. The sine wave output of the goniometer is applied to a phase detector together with the received pulse. The detector output drives a servo that in turn has its output shaft connected to drive the goniometer to a point of balance. Since a comparatively high frequency sine wave must be employed to provide the desired steep wave slope for the desired accuracy, this portion of the system might provide an ambiguous reading by locking in on the wrong sine wave cycle under certain conditions.

Such ambiguity is avoided in the present system by employing a second phase detector to which a linear sawtooth wave of comparatively low frequency is applied together with the received pulse. This low frequency is a sub-multiple of the sine wave frequency. The output of the second phase detector is connected, under certain conditions described below, to the servo at which time the first phase detector is disconnected from the servo. The servo output shaft is connected to effectively shift the phase of the sawtooth wave to bring the system to at least approximately a point of balance. The output circuit of this second phase detector is also connected to a relay circuit that functions as follows:

Whenever the output of the second phase detector exceeds certain voltage limits, the relay disconnects the servo control from the output circuit of the first phase detector and connects it to the output circuit of the second phase detector. The said voltage limits are such that the servo is switched to the second phase detector whenever the system starts to lock in on the wrong sine wave cycle during operation by the first phase detector.

The invention will be better understood from the following description taken in connection with the accompanying drawings in which:

Fig. 2 is a circuit diagram of a phase shifter employed in the altimeter shown in Fig. 1;

Fig. 3 is a circuit diagram of a pulse selector employed in the altimeter shown in Fig. 1;

Figs. 4 and 5 are circuit diagrams of phase detectors and associated circuits employed in the altimeter shown in Fig. 1;

Fig. 6 is a circuit diagram of a servo system employed in the altimeter shown in Fig. 1;

Figs. 7 and 8 are groups of graphs that are referred to in explaining the operation of the altimeter shown in Fig. 1; and Fig. 9 is a diagram showing how a portion of the system of Fig. 1 may be modified in accordance with another embodiment of the invention.

In the several figures like parts are indicated by like reference characters.

Figure 1:
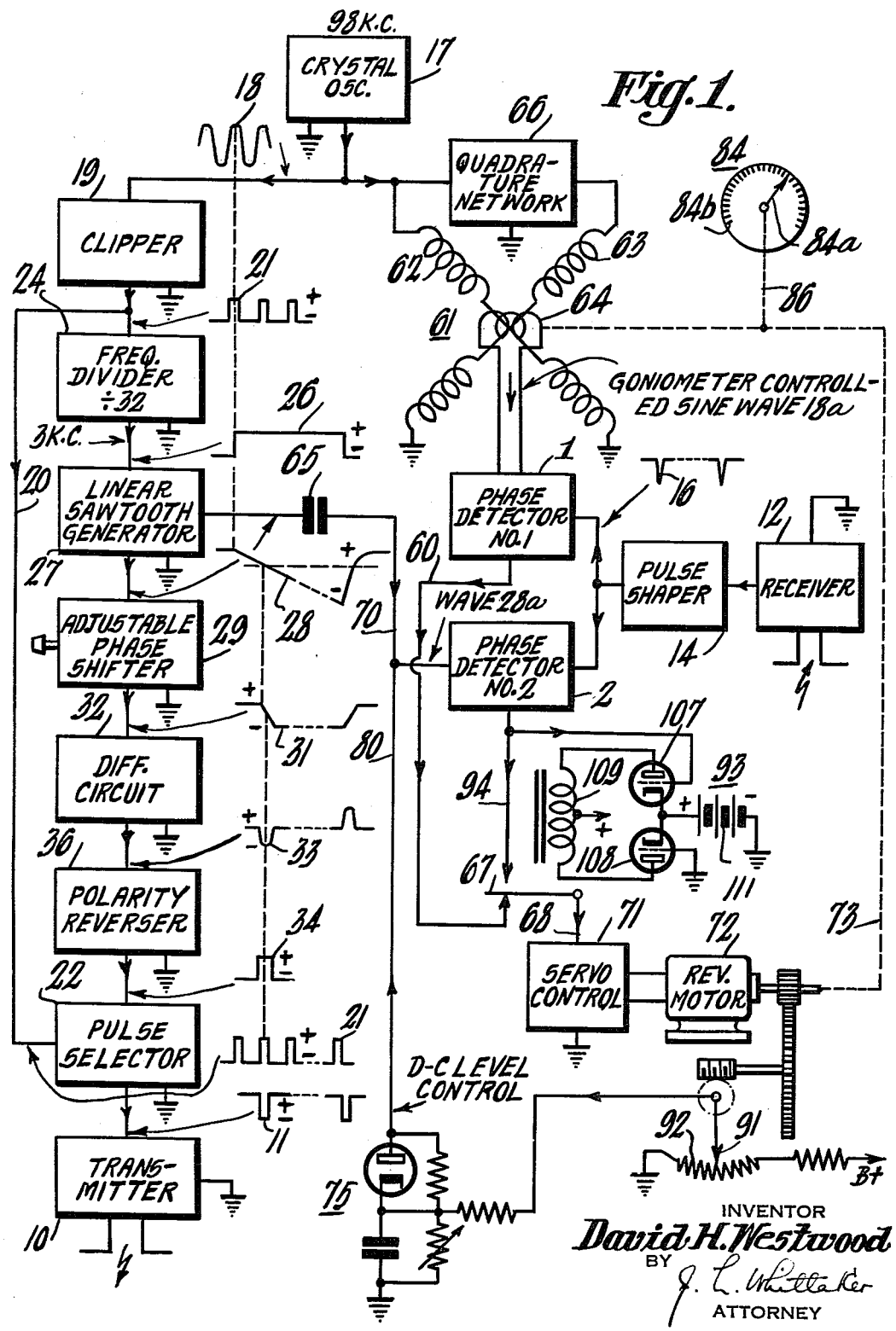
Fig. 1 is a block diagram of an altimeter embodying my invention.

Referring to Fig. 1 of the drawing, the altimeter comprises a pulse transmitter 10 that transmits radio pulses of a certain periodic rate with each pulse of very short duration. This is in accordance with conventional pulse-echo radar practice. The transmitter 10 is modulated by periodically recurring pulses 11.

The reflected pulses are received by a receiver 12, demodulated and amplified and applied either directly to a phase detector No. 1 and to a phase detector No. 2 indicated by reference characters 1 and 2, respectively, or to the phase detectors through a pulse shaper 14 comprising a gas or vapor tube that breaks down and produces a sharp pulse 16 each time a reflected pulse is impressed upon it.

*Pulse transmission channel*

Reference will now be made to the portion of the circuit of Fig. 1 for generating the transmitter modulating pulses 11. A stable sine wave oscillator 17, which preferably is a crystal controlled oscillator, generates a sine wave 18 which has a frequency of 98.323 kc. in the example described. The sine wave signal 18 is passed through a limiter or clipper 19 and the resulting 98 kc. pulses 21 are applied over a lead 20 to a pulse selector 22 (shown in detail in Fig. 3). Refer to both Fig. 1 and Fig. 6 for an illustration of the various wave forms and their phase relation.

The pulses 21 from clipper 19 are also applied to a suitable frequency divider 24 which may consist of a plurality of multivibrator stages. In the present example the divider 24 divides by 32 to produce a rectangular wave 26 having a repetition rate of 3 kc. This is the repetition rate that is desired for the transmitter modulating pulses 11.

The pulses 26 drive a linear sawtooth generator 27 to produce a negative going sawtooth wave 28 having a repetition rate of 3 kc. Circuits for producing such sawtooth waves are well known in the art and need not be described in detail.

The sawtooth wave 28 is applied to an adjustable phase shifter circuit 29 for the purpose of obtaining 3 kc. pulses that preferably are adjustable in phase for calibration purposes as explained hereinafter. The phase shifter 29 preferably is of the type shown in detail in Fig. 2. This phase shifter is described in my copending application Serial No. 151,677, now Patent No. 2,599,305, issued June 3, 1952, filed March 24, 1950, and entitled Electrical Pulse Delay Circuit. As will be described hereinafter in connection with Fig. 2, the phase shifter 29 produces pulses 31 having front edges adjustable in timing or phase. The pulses 31 are passed through a differentiating circuit 32 to produce wave 33 that includes a negative pulse having the same timing as the front edge of pulse 31. This negative pulse is reversed in polarity to provide pulse 34 by a polarity reverser 36 such as a single stage amplifier and applied to a grid of the pulse selector 22 (see Fig. 3).

The pulse selector output consists of the modulating pulses 11. These pulses 11 are pulses from the wave 21 which have been selected by the wave 34. Thus, the output pulses 11 have the accuracy and stability of the 98 kc. pulses 21 and the 3 kc. repetition rate of the pulses 34.

Fig. 3 shows one suitable form of pulse selector. Such circuits are also referred to as coincidence circuits. In the example shown, the circuit comprises a six-element vacuum tube 36 which is adjusted to pass signal only when there are positive signal voltages applied simultaneously to the two input grids. More specifically, the input grids are negatively biased sufficiently to prevent a flow of plate current if signal is on only one input grid. This bias is provided by grid leak biasing action well known in the art. Thus, one of the pulses 21 can appear in the output circuit of the pulse selector 22 only when a pulse 34 is coincident with one of the pulses 21. Said one pulse then appears in the output as the pulse 11.

It will be understood that there are various other forms of pulse selectors that may be employed in place of the particular one illustrated.

The invention is not limited to the use of the particular type of phase shifter shown at 29. The purpose of the phase shifter 29 is to select by means of gate pulse 34 the time of triggering or keying of the transmitter 10. Normally the first of the 98 kc. pulses 21 immediately following the start of the sawtooth wave 28 is selected as illustrated in Fig. 7 to obtain the transmitter pulse 11. For calibration purposes, however, it may be desirable to have phase shifter 29 adjustable in steps to select other than the first of the pulses 21.

*The phase shifter 29*

Fig. 2 shows the details of the phase shifter 29. The sawtooth wave 28 is applied with negative polarity through a coupling capacitor 42 to the grid of a vacuum tube V1. The tube V1 and a tube V2 have a common cathode resistor 43. In the example shown, the tubes V1 and V2 are each one-half of a vacuum tube type 12AX7.

Anode potential is applied directly to the anode of the tube V1 whereby the tube V1 acts as a cathode follower. Anode potential is applied to the anode of the tube V2 through an anode resistor 44.

The delayed output pulse 31 is taken off the anode of tube V2.

Referring now to the grid biasing means for the two tubes, the tube V1 has bias voltage applied to its grid through a grid resistor 46. This bias voltage is supplied from a variable tap 47 on one section of a potentiometer 48. This potentiometer is connected across the anode voltage supply for the tubes V1 and V2. In the specific example shown, the potentiometer 48 consists of three resistor sections, the middle section being adjustable to permit adjusting the amount of phase change of the output pulse 31 for a given change in the position of the variable tap 47.

By varying the position of the tap 47 and thereby varying the bias on the tube V1, the timing of the front edge of the output pulse 31 is varied as will be explained hereinafter.

The tube V2 has bias applied to its grid by way of a lead 49. The bias is supplied from a potentiometer 51 that is connected across the anode supply of the tubes V1 and V2. In the specific example illustrated, the potentiometer 51 consists of three resistor sections, and the bias is taken off the middle section by a tap 52 that preferably is adjustable.

Tap 47 determines the D.-C. operating level of the applied voltage wave, thus, the voltage on the grid at any particular time is the sum of the D.-C. voltage on tap 47 and the instantaneous value of the applied sawtooth wave referred its average value. As previously stated, during a positive portion of the applied sawtooth wave and before the negative going portion begins, tube V1 is conducting and tube V2 is biased to cut-off. It will be noted that the flow of current from V1 through cathode resistor 43 makes the cathode of tube V2 positive with respect to its grid and thus biases tube V2 to cut-off. Under this condition the output voltage at the anode of tube V2 is a maximum and is equal to the plus B voltage. The tap 52 furnishes the bias to the grid of V2 and hence determines the voltage to which the cathode of V2 must be lowered in order to start anode to cathode conduction in V2.

Now consider the circuit action when the negative going portion of the applied sawtooth wave 28 begins. Cathode follower action of V1 causes the voltage across cathode resistor 43 also to go more negative and finally a point is reached on the the negative slope of 28 at which the cathode to grid voltage of V2 is such as to cause anode to cathode conduction in V2. This is indicated by the broken line at graph 28. As a result of V2 becoming conducting its anode voltage drops thereby producing the front edge of the output pulse 31. When V2 is fully conducting the voltage across the cathode resistor 43 is held to a constant value near that of the grid voltage and determined by the tube characteristics of V2. As the voltage wave on the grid of V1 continues to go more negative the conduction through V1 is cut off. Thus the front edge of pulse 31 has been caused to occur at a time delayed by an amount determined both by the shape of the applied voltage wave and the relative value of bias voltages on taps 47 and 52.

Described differently the circuit action is thus: The bias voltage set by tap 52 determines the voltage necessary on the cathode of V2 to cause conduction in V2 while the bias voltage furnished by the tap 47 determines at which point on the applied wave this particular voltage is caused to occur on the cathode of V2 by the cathode follower action of V1. Therefore, as the tap 47 is varied the point on the applied wave at which V2 conducts is varied, thus varying the delay of the leading edge of the output pulse.

The pulse 31 remains at a fixed reduced voltage value so long as the tube V2 conducts and the tube V1 remains cut-off. As the voltage of sawtooth wave 11 rises during the return period, a point is reached where tube V1 again becomes conducting and the tube V2 is again driven to cut-off. This produces the back edge of the pulse 31.

It should be noted that as the tap 47 is varied to vary the delay of output pulse 31, there is no change in the amplitude of the pulse 31 since the operating characteristics of the tube V2 remain unchanged.

The pulse 31 is differentiated by the differentiating circuit 32 comprising a small capacity capacitor 53 and a resistor 54. The resulting wave is indicated at 33.

The servo and phase detector circuits

The phase detector No. 1 is supplied with a phase reference wave as follows:

The sine wave 18 from the crystal oscillator 17 is passed through a goniometer type phase shifter 61 which may be of conventional construction comprising two stator coils 62 and 63 positioned 90 degrees apart and a rotor coil 64. The sine wave signal 18 is fed to one of the stator coils through a quadrature network 66 to provide a 90 degree phase shift.

Sine wave signal 18a from the rotor coil 64 is applied to the phase detector No. 1 where its phase is compared with that of the received pulse 16.

The output of phase detector No. 1 is supplied by way of a lead 60, a relay armature 67, and a lead 68 to a servo control unit 71. The servo control 71 operates a reversible motor 72 which drives the goniometer rotor 64 through a mechanical coupling indicated by the broken line 73. The phase comparison waves 18a are shifted automatically in phase by the phase detector and servo operation until a balanced condition is reached. An altitude or distance indicator 84 is connected to the phase shifter rotor 64 as indicated by a broken line 86.

Any suitable indicator may be provided. In the simple form illustrated a rotatable pointer 84a is connected directly to the shaft driving the phase shifter rotor 64. A dial 84b is calibrated in feet. It will be understood that the altimeter may be used for automatic control purposes, in which case no altitude indicator may be provided. The important thing is that the servo output shaft of the system assumes an angular position that is an accurate indication of altitude or distance.

The phase detector No. 2 is provided with a phase comparison wave as follows:

The sawtooth wave 28 is applied to the phase detector No. 2 by way of a coupling capacitor 65 and a lead 70. Direct-current level-setting voltage is applied to phase detector No. 2 from a clamping circuit 75 by way of a lead 80. The D.-C. level is determined by the position of the variable tap 91 on a linear potentiometer 92 connected across a direct-current source. Thus, as indicated in Fig. 8, the top of the sawtooth wave 28 is clamped to the voltage at the potentiometer tap 91 and as the voltage at tap 91 is varied, the phase of the sawtooth wave with respect to the received pulse is effectively varied.

The level-setting tap 91 is connected through suitable gearing to the shaft of the motor 72.

If the output of the phase detector No. 2 is greater than a predetermined value (either +V1 or —V1 as indicated in Fig. 8), a relay 93 pulls up the armature 67 to connect the output circuit of phase detector No. 2 to the servo control 71 by way of a lead 94, the armature 67 and the lead 68. Thus, as explained hereinafter, the servo drives the potentiometer pointer 91 to a point where the system is balanced within coarse limits. Then the relay 93 releases, the armature 67 drops down, and the fine accurate control is taken over by the phase detector No. 1.

Before considering the circuit operation further, reference will be made to the circuit details of portions of the circuit described above.

Phase detector No. 1

Referring to Fig. 4, the phase detector No. 1 in the specific example illustrated is of the type described in Patent No. 2,250,284 issued July 22, 1941, in the name of Karl R. Wendt. The particular circuit shown in Fig. 4 comprises four diodes D1, D2, D3 and D4. The diodes D1 and D2 are connected in series cathode to anode in one branch and the diodes D3 and D4 are connected in series cathode to anode in a second branch. The anodes of diodes D1 and D3 are connected through a capacitor 96 to one terminal of the secondary 97 of a transformer 98. The cathodes of the diodes D2 and D4 are connected through a capacitor 99 to the other terminal of secondary 97. The bid-point of secondary 97 is grounded.

A storage capacitor 101 is connected between ground and the junction point of the cathode of diode D3 and the anode of diode D4. The voltage appearing across this capacitor is applied to the servo system by a lead 60.

High impedance resistors 102 and 103 of like value are connected across the two diode branches and grounded at their midpoint. It will be noted that these resistors are in shunt to the capacitors 96 and 99 whereby the diodes are suitably biased to be non-conducting between applied pulses as described hereinafter. This corresponds to a grid-leak biasing action.

The comparison sine wave is applied through a transformer 104 to the junction point of the cathode of diode D1 and the anode of D2.

The pulses 16, which correspond to the reflected pulses, are applied to the primary 106 of the transformer 98.

In operation, if the pulse 16 is coincident with the balance point on the back edge of a sine wave cycle (see Fig. 8), there will be no voltage applied to the storage capacitor 101 and, therefore, no voltage will be applied to the servo system. If pulse 16 falls above this balance point, capacitor 101 will be charged in one direction. If pulse 16 falls below this balance point, capacitor 101 will be charged in the opposite direction.

Phase detector No. 2

Referring to Fig. 5, the phase detector No. 2 is of the same type as phase detector No. 1 and need not be described in detail. Here the phase comparison wave is the sawtooth wave 28 which has its direct-current level varied as a function of the voltage at the potentiometer tap 91 (Fig. 1). As previously stated, the top of the sawtooth wave 28 is clamped to the voltage of the tap 91.

This clamping is accomplished by means of the conventional clamping circuit 75 comprising a clamping diode and associated circuit which is too well known to require description.

The relay circuit

The relay circuit 93 pulls up the armature 67 whenever the magnitude of the output of phase detector No. 2 falls outside of predetermined maximum and minimum limits. Any suitable relay may be employed. The particular relay illustrated comprises a pair of vacuum tubes 107 and 108 that have the upper and lower halves, respectively, of a relay coil 109 in their anode circuits. The grid of tube 108 is grounded so that when the output voltage of phase detector No. 2 is zero, the anode currents of the tubes 107 and 108 are equal. Thus equal and opposing currents flow through the relay coil 109 and the armature 67 remains at its lower position connecting phase detector No. 1 to the servo. A bias source 111 is provided so that the tubes 107 and 108 operate over the linear portion of their characteristic curve.

In the particular example illustrated in Fig. 8, the relay 93 will operate if the output of phase detector No. 2 becomes plus one volt or greater or if it becomes minus one volt or less.

It should be understood that the particular arrangement of relay tubes and mechanical relay may be replaced by other suitable arrangements such as those employing vacuum tube switching or the like with no mechanical relay.

The servo

Fig. 6 illustrates one form of servo control system merely by way of example. It comprises an amplifier tube 112 which has its control grid D.-C. connected to the relay armature 67.

Relay 113 in the motor control circuit is a three position relay having up, down, or center position. The tube 112 which controls the relay is biased in such a manner to cause the relay to assume a center position with zero voltage on the grid of the tube 112. When the phase detector voltage goes positive, the relay closes to one position (say the "up" position); when the voltage goes minus, the relay closes to the opposite position ("down" position). The "up" position results in a motor rotation in one direction whereas the "down" position results in a motor rotation in the opposite direction. In the center position the motor is not energized. Thus the reversible motor 72 driven by a battery 113 is driven in one direction or the other depending upon whether a positive or a negative voltage is supplied from the phase detector to which the servo is connected.

Operation

Fig. 7 is a group of graphs showing the time relation of the various voltage wave forms appearing in the apparatus of Fig. 1.

Referring to the goniometer controlled sine wave 18a and the D.-C. level controlled sawtooth wave 28a, it will be seen that they are shown in the condition of balance with respect to the received pulses 16. Under this condition neither the phase detector No. 1 nor the phase detector No. 2 has any output voltage so long as the altitude (or distance) is unchanging.

The graphs 18a, 28a, and 16 are repeated on a larger scale in Fig. 8 which will now be referred to. It will be noted that the balance points on the waves 18a and 28a coincide. This condition is always maintained as the goniometer 61 and the potentiometer tap 91 are driven by the servo. This is accomplished by properly gearing the servo motor 72 to the tap 91 and by matching the slope of the linear sawtooth 28a to the linear potentiometer 92 in such a way that at any balance position throughout the range the direct-current output of phase detector No. 2 is substantially zero.

Under normal balance conditions the D.-C. output of phase detector No. 1 controls the servo motor 72. The ambiguity previously mentioned cannot exist since the error voltage obtained from the linear sawtooth wave controls the servo until the altitude indication is within a distance corresponding to one-half the crystal oscillator period. At this point the goniometer phase shifted wave 18a takes over and determines the balance position. Thus the final accuracy is determined by the crystal oscillator 17 and the goniometer phase shifter 61.

It should be understood that the invention is not limited to the specific embodiment illustrated. For example, instead of a linear sawtooth wave 28, an exponential sawtooth wave or a low frequency sine wave may be employed in the circuit of Fig. 1. In either case the potentiometer 92 must then have a suitable non-linear characteristic to match the shape of the exponential wave or the sine wave as the case may be.

If the sawtooth wave is replaced by a sine wave it may be preferred to shift its phase by means of a goniometer type phase shifter that is geared to the phase shifter 61. Such an arrangement is illustrated in Fig. 9. In the example shown the 3 kc. rectangular wave output of frequency divider 24 is converted into a 3 kc. sine wave by the tuned circuit 121. The 3 kc. since wave is applied to a phase shifter 122 which may be similar to the phase shifter 61. The sine wave output of phase shifter 122 is applied to the phase detector No. 2 so that the back slope of the since wave performs the same function in the phase detector as the linear slope of the sawtooth wave 28 in the embodiment of Fig. 1.

If preferred, the 3 kc. sine wave may be obtained, for example, by supplying the output of the crystal oscillator 17 to a regenerative frequency divider which itself includes a tuned circuit.

As indicated in Fig. 9, the rotor of phase shifter 122 is geared to the servo output shaft, i. e., the shaft of motor 72. If phase shifters 61 and 122 are both of the goniometer type the ratio of the gearing is 1 to 32, where the frequency is divided by 32, so that the rotor of phase shifter 61 makes 32 rotations to one rotation of the rotor of phase shifter 122.

Similarly, in the high frequency phase comparison circuit the invention is not limited to the particular phase shifting arrangement illustrated. Where a sine wave is employed for phase comparison at the phase detector No. 1, the phase shifter may be of a type other than the goniometer type although the goniometer type is preferred.

Instead of employing a sine wave in the high frequency phase comparison circuit, it may be preferred to employ the same phase shifting technique as that illustrated for the low frequency phase comparison circuit. Specifically, the quadrature network 66 and goniometer 61 may be replaced by a sawtooth generator that produces high frequency sawtooth waves and their phase may be effectively shifted by varying their direct-current level by means of another potentiometer having a tap driven by the servo.

What I claim to be my invention is:

1. A pulse-echo distance measuring system comprising means for transmitting pulses of energy and receiving them after reflection from an object as pulse signals, said system comprising a first phase detector, means for producing a phase comparison signal having a definite time relation to said transmitted pulses and having a repetition rate that is high compared with that of said transmitted pulses, means for applying said comparison signal and said pulse signals to the first phase detector for obtaining an output that is a function of the phase relation of the applied signals, a servo means that is normally connected to be controlled by the output of the first phase detector only, means connected to the output of said servo for effectively shifting the phase of said comparison signal for driving the system to a condition of balance, and means for avoiding ambiguity due to lock-in on the wrong cycle of said phase comparison signal, said last means comprising means for producing a second phase comparison signal having a frequency that is a sub-multiple of the frequency of the first phase comparison signal, a second phase detector, means for applying said second phase comparison signal and said pulse signals to the second phase detector for obtaining an output that is a function of the phase relation of the signals applied to the second phase detector, means connected to the output of said servo for effectively shifting the phase of the second phase comparison signal for driving the system to at least approximately a condition of balance, and means for causing the output of the second phase detector only to assume control of the servo system in response to the output of the second phase detector falling outside of predetermined amplitude limits and to relinquish control in response to said last-mentioned output falling within said limits.

2. A pulse-echo distance measuring system comprising means for transmitting pulses of energy and receiving them after reflection from an object as pulse signals, said system comprising a first phase detector, means for producing a phase comparison signal having a definite time relation to said transmitted pulses and having a repetition rate that is high compared with that of said transmitted pulses, a phase shifter, means for passing said phase comparison signal through said phase shifter to obtain a phase shifted comparison signal, means for applying said phase shifted comparison signal and said pulse signals to the first phase detector for obtaining an output that is a function of the phase relation of the applied signals, a servo means that is normally connected to be controlled by the output of the first phase detector only and which has its output connected to drive said phase shifter for driving the system to a condition of balance, and means for avoiding ambiguity due to lock-in on the wrong cycle of said phase comparison signal, said last means comprising means for producing a second phase comparison signal having a frequency that is a sub-multiple of the frequency of the first phase comparison signal, a second phase detector, means for applying said second phase comparison signal and said pulse signals to the second phase detector for obtaining an output that is a function of the phase relation of the signals applied to the second phase detector, means connected to the output of said servo for effectively shifting the phase of the second phase comparison signal for driving the system to at least approximately a condition of balance, and means for causing the output of the second phase detector only to assume control of the servo system in response to the output of the second phase detector falling outside of predetermined amplitude limits and to relinquish control in response to said last-mentioned output falling within said limits.

3. In a system for measuring the time of occurrence of a pulse signal with respect to a reference time, said system comprising a first phase detector, a second phase detector, means for producing a comparatively high frequency signal having a definite time relation to said reference time, means for applying said high frequency signal and said pulse signal to the first phase detector for obtaining an output that is a function of the phase relation of the applied signals, means for producing a signal having a comparatively low frequency that is a sub-multiple of said high frequency, means for applying said low frequency signal and said pulse signal to the second phase detector for obtaining an output that is a function of the phase relation of the signals applied to the second phase detector, a servo means that may be selectively controlled by the output of one of said phase detectors, means including said servo means for simultaneously effectively shifting the phase of said high frequency signal and of said low frequency signal for driving the system to a condition of balance, and control means for supplying the output of the first phase detector only to the servo means to control it so long as the output of the second phase detector remains within predetermined amplitude limits and for supplying the output of the second phase detector only to the servo means to control it in response to the output of the second detector exceeding said limits.

4. In a system for measuring the time of occurrence of a pulse signal with respect to a reference time, said system comprising a first phase detector, a second phase detector, means for producing a comparatively high frequency sine wave signal having a definite time relation to said reference time, a goniometer type phase shifter through which said sine wave signal is applied to the first phase detector, means for also applying said pulse signal to the first phase detector for obtaining an output that is a function of the phase relation of the applied signals, means for producing a signal having a comparatively low frequency that is a sub-multiple of said high frequency, means for applying said low frequency signal and said pulse signal to the second phase detector for obtaining an output that is a function of the phase relation of the signals applied to the second phase detector, a servo means that may be selectively controlled by the output of one of said phase detectors, said servo means having an output shaft connected to said goniometer to shift the phase of said sine wave for driving the system to a condition of balance, said output shaft also being connected to means for simultaneously effectively shifting the phase of said low frequency signal for driving the system to a condition of balance, and control means for supplying the output of the first phase detector only to the servo means to control it so long as the output of the second phase detector remains within predetermined amplitude limits and for supplying the output of the second phase detector only to the servo means to control it in response to the output of the second detector exceeding said limits.

5. A pulse-echo distance measuring system comprising means for transmitting pulses of energy and receiving them after reflection from an object, means for producing a comparatively high frequency phase comparison signal that is variable in phase with respect to said transmitted pulses, a first phase detector, means for applying said high frequency phase comparison signal and said received pulses to said first phase detector to obtain an output that is a function of the phase relation of said applied signals, means for producing a comparatively low frequency phase comparison signal that is effectively variable in phase with respect to said transmitted pulses, a second phase detector, means for applying said low frequency phase comparison signal and said received pulses to said second phase detector to obtain an output that is a function of the phase relation of said signals applied to said second phase detector, servo means connected to vary simultaneously the phase of said first comparison signal and of said second comparison signal, and means for supplying the output of the first phase detector only to said servo means so long as the output of said second phase detector is less than a predetermined value and for supplying the output of the second phase detector only to said servo means in response to the output of the second phase detector exceeding said predetermined value.

6. A pulse-echo distance measuring system comprising means for transmitting pulses of energy and receiving them after reflection from an object, means comprising a stable oscillator for producing a comparatively high frequency sine wave signal that has a definite time relation with respect to said transmitted pulses, a phase shifter, a first phase detector, means for supplying said sine wave signal to said phase detector through said phase shifter, means including said phase detector for comparing the phase of said sine wave signal and said received pulses whereby the output of said phase detector is a function of said phase relation, means for producing a linear sawtooth wave having the same repetition rate as said transmitted pulses, a second phase detector, means for supplying said sawtooth wave to said second phase detector, means for shifting the direct-current level of said sawtooth wave and thereby effectively shifting its phase, means including said second phase detector for comparing the phase of said sawtooth wave and said received pulses whereby the output of said second phase detector is a function of said last-mentioned phase relation, servo means connected to drive said phase shifter and to vary the direct-current level of said sawtooth wave simultaneously, means supplying the output of the first phase detector only to said servo means so long as the output of the second detector remains within predetermined amplitude limits, and means for supplying the output of the second detector only to said servo means in response to the output of the second phase detector exceeding said limits.

7. A pulse-echo distance measuring system comprising means for transmitting pulses of energy and receiving them after reflection from an object, means comprising a stable oscillator for producing a comparatively high frequency sine wave signal that has a definite time relation with respect to said transmitted pulses, a goniometer type phase shifter, a first phase detector, means for supplying said sine wave signal to said phase detector through said phase shifter, means including said phase detector for comparing the phase of said sine wave signal and said received pulses whereby the output of said phase detector is a function of said phase relation, means for producing a linear sawtooth wave having the same repetition rate as said transmitted pulses, a second phase detector, means for supplying said sawtooth wave to said second phase detector, means for shifting the direct-current level of said sawtooth wave to shift the cross-over point of said sawtooth wave at a reference potential and to thereby effectively shift its phase, means including said second phase detector for comparing the phase of said sawtooth wave and said received pulses whereby the output of said second phase detector is a function of said last-mentioned phase relation, servo means connected to drive said goniometer type phase shifter and to vary the direct-current level of said sawtooth wave simultaneously, means supplying the output of the first phase detector only to said servo means to drive said system to a condition of balance so long as the output of the second detector remains within predetermined amplitude limits, and means for supplying the output of the second detector only to said servo means to drive said system to a condition of balance in response to the output of the second phase detector exceeding said limits.

8. A system for controlling a servo means as a function of the time relation between a reference signal and a signal that has a variable time relation to said reference signal, said system comprising a first phase detector, means for producing a phase comparison signal having a definite time relation to said reference signal and having a repetition rate that is high compared with that of said reference signal, means for applying said comparison signal and said variable time relation signal to the first phase detector for obtaining an output that is a function of the phase relation of the applied signals, a servo means that is normally connected to be controlled by the output of the first phase detector only, means connected to the output of said servo for effectively shifting the phase of said comparison signal for driving the system to a condition of balance, and means for avoiding ambiguity due to lock-in on the wrong cycle of said phase comparison signal, said last means comprising means for producing a second phase comparison signal having a frequency that is a sub-multiple of the frequency of the first phase comparison signal, a second phase detector, means for applying said second phase comparison signal and said variable time relation signal to the second phase detector for obtaining an output that is a function of the phase relation of the signals applied to the second phase detector, means connected to the output of said servo for effectively shifting the phase of the second phase comparison signal for driving the system to at least approximately a condition of balance, and means for causing the output of the second phase detector only to assume control of the servo system in response to the output of the second phase detector falling outside of predetermined amplitude limits and to relinquish control in response to said last-mentioned output falling within said limits.

9. A system for controlling a servo means as a function of the time relation between a time reference signal and a signal that has a variable time relation to said reference signal, said system comprising a first phase detector, a second phase detector, means for producing a comparatively high frequency signal having a definite time relation to said time reference signal, means for applying said high frequency signal and said variable time relation signal to the first phase detector for obtaining an output that is a function of the phase relation of the applied signals, means for producing a signal having a comparatively low frequency that is a sub-multiple of said high frequency, means for applying said low frequency signal and said variable time relation signal to the second phase detector for obtaining an output that is a function of the phase relation of the signals applied to the second phase detector, a servo means that may be selectively controlled by the output of one of said phase detectors, means including said servo means for simultaneously effectively shifting the phase of said high frequency signal and of said low frequency signal for driving the system to a condition of balance, and control means for supplying the output of the first phase detector only to the servo means to control it so long as the output of the second phase detector remains with predetermined amplitude limits and for supplying the output of the second phase detector only to the servo means to control it in response to the output of the second detector exceeding said limits.

References Cited in the file of this patent

UNITED STATES PATENTS

| | | |
|---|---|---|
| 2,422,074 | Bond | June 10, 1947 |
| 2,426,216 | Hight | Aug. 26, 1947 |
| 2,470,464 | Bowie | May 17, 1949 |
| 2,513,988 | Wolff et al. | July 4, 1950 |